United States Patent [19]

Babayan

[11] 3,717,612

[45] Feb. 20, 1973

[54] CURABLE EPOXY RESIN COMPOSITION CONTAINING A SUBSTITUTED DIUREA COMPOUND

[75] Inventor: Eduard P. Babayan, Inglewood, Calif.

[73] Assignee: Hitco, Gardena, Calif.

[22] Filed: June 22, 1970

[21] Appl. No.: 48,538

[52] U.S. Cl.......260/47 EN, 117/124 E, 117/126 AB, 117/126 GE, 117/138.8 F, 117/161 ZB, 161/184, 161/185, 260/2 N, 260/59, 260/77.5 CH, 260/80.3 R, 260/88.3 A, 260/553 R, 260/830 TW

[51] Int. Cl. .............................................C08g 30/14

[58] Field of Search........260/47 EN, 2 N, 59, 553 R, 260/88.3 A, 75 NT, 77.5 CH

[56] References Cited

UNITED STATES PATENTS

| | | | |
|---|---|---|---|
| 3,562,215 | 2/1971 | Moore | 260/47 |
| 3,386,956 | 6/1968 | Chrobok | 260/47 EN |
| 3,386,955 | 6/1968 | Chrobok | 260/47 EN |
| 3,401,190 | 9/1968 | Schmitt et al. | 260/77.5 AT |

OTHER PUBLICATIONS

Chemical Abstracts Vol. 57 (p2367a) 7/1962

Primary Examiner—William H. Short
Assistant Examiner—T. Pertilla
Attorney—Lindenberg, Freilich and Wasserman and Victor G. Laslo

[57] ABSTRACT

An improved curing agent for epoxy resin compositions containing a polyepoxide comprising a substituted diurea formed by the reaction of two mols of a secondary amine, preferably an aliphatic amine, such as dimethylamine with one mol of a diisocyanate containing one cycloaliphatic isocyanate group and one aliphatic isocyanate group such as isophorone diisocyanate. The curing temperature of the composition can be substantially increased to provide products having improved properties without the danger of undercuring or substantial shortening of the gel time.

9 Claims, No Drawings

CURABLE EPOXY RESIN COMPOSITION CONTAINING A SUBSTITUTED DIUREA COMPOUND

BACKGROUND OF THE INVENTION

1. Field of the Invention

The present invention relates to ambient temperature stable mixtures of epoxy resins and curing agents which are curable at elevated temperature to form insoluble and infusible products. More particularly, this invention relates to novel and improved polyurea curing agents for these systems.

2. Description of the Prior Art

Many diverse types of amine compounds have been developed that are capable of irreversibly converting polyepoxide compounds to an insoluble, and infusible state in a reasonably short period of time. Most industrial applications of epoxies such as adhesives, laminates, encapsulating, decorating and molding require that the composition be in a stable intermediate, flowable form so that it can be molded, spread, coated or shaped during fabrication steps for forming final articles.

Many well known classes of amine curing agents have relatively short shelf or pot life. Due to this tendency to cure or resinify spontaneously and/or in a short period of time, the curing agent cannot be premixed with the polyepoxide to form an intermediate B-stage type of product. The fabricator or user is required to mix the resin and curing agent just prior to use and must fabricate the article before spontaneous cure can occur.

This procedure results in waste of material, places a considerable equipment and operational burden on the fabricator and can result in defective products from inefficient mixing or excessively rapid work-up procedures.

Various expedients and modifications that have been reported to increase pot-life have limitations that are not acceptable. Encapsulation of amine curing agents in a hardened protective colloid, as described in U.S. Pat. No. 3,018,258 is expensive. Pot life of polyepoxides was considerably increased by utilizing as the curing agent, a tertiary amine salt of an α-oxy-substituted acid as disclosed in a copending application Ser. No. 783,284, filed Dec. 12, 1968. This resin system exhibited satisfactory latency, at low concentrations of the curing agent and cure temperatures of 125°C or lower. However, satisfactory performance was not achievable at higher temperature because the concentration was too low and if the concentration was increased, the flow properties were not acceptable.

SUMMARY OF THE INVENTION

With the use of the novel curing agent of this invention in polyepoxide resin systems, the curing temperature can be increased to realize full cure and still provide acceptable gel time. The mechanical properties of the cured products are therefore much improved. Furthermore, the curing agents are compatible with previously used catalysts and when used in combination, the total catalyst concentration can be increased. Even better cures are achieved at the higher total catalyst concentration level without sacrificing flow or shelf life.

The curing agent in accordance with the invention is a substituted diureido compound of the formula:

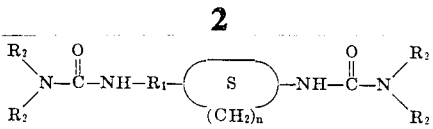

where $R_1$ is a lower aliphatic group, preferably lower alkyl of one to 10 carbon atoms, $R_2$ is an organic group preferably a hydrocarbon aliphatic group suitably alkyl of one to 10 carbon atoms, and $n$ is an integer from 4 to 10.

The curing agent can be prepared by reacting a diisocyanate of the formula:

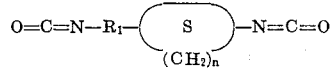

with two moles of a secondary amine of the formula:

which react to form a white crystalline solid.

The reaction is preferably carried out in a solvent absent of hydroxy or acid groups such as a low boiling ketone, e.g., acetone, methyl ethyl ketone or methyl isobutyl ketone, or aromatic solvents such as benzene or toluene and the like. Faster reaction is realized in a polar solvent such as dimethyl formamide.

The reaction can be carried out over a wide range of temperatures. The reaction can be carried out in a gas/liquid reactor at a temperature as high as limited by the boiling point of the solvent utilized, suitably 200° to 250°F. The reaction can also be carried out conveniently at temperatures below the boiling point of the reactants, which is 7°F in the case of dimethyl amine. Generally, the diisocyanate reactant is dissolved in the solvent and the amine is added to this solution in liquid or gas form. It is also possible to dissolve the amine in the solvent and add the diisocyanate to this solution. It is preferable to provide a slight excess of amine to assure complete reaction. After the reaction is complete, the desired white crystalline product is filtered off from the solvent and dried.

The preferred curing agent is a dialkyl ureidoalkyl, dialkylureido, dialkyl-cyclohexane of the formula:

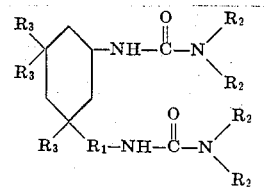

where $R_1$, $R_2$ and $R_3$ are lower alkyl. When $R_1$, $R_2$ and $R_3$ are methyl, the compound is 3-dimethylureidyl-methyl, 3,5,5,-trimethyl-cyclohexyl-dimethyl urea. The diisocyanate starting material is 3-isocyanate-methyl-3,5,5,-trimethyl cyclohexylisocyanate (IPDI) also known as isophorone diisocyanate. The corresponding diurea could be appropriately terminated isophorone diurea. An example of synthesis of isophorone diurea follows:

EXAMPLE I

| Reagents | Amount, Grams |
|---|---|
| IPDI (M.W.227.28) | 333 |
| Dimethylamine | 145 |
| Acetone | 750 |

The IPDI is dissolved in the acetone and cooled to −15°C. The dimethylamine is added over a cold condenser at a rate of 100 drops per minute. After all the dimethylamine is added, the solution is allowed to react and warm with agitation. Isophorone tetramethyl diurea forms as a white powder having a melting point of 203°–204°C. The powder is filtered and dried.

The curing agents according to the invention may be utilized individually as a curing agent on a basis by weight of about one to 10 parts of agent per 100 parts of resin (Phr) preferably about 3–7 parts. The curing agent can also be employed in reduced amount of one to five parts, suitably 2–4 parts with 0.3–5 parts of other curing agents such as tertiary amine salts of an α-oxy-substituted acid as described in a copending application Ser. No. 783,284, filed Dec. 12, 1968.

The composition may also contain 0.3 to 10 parts of curing promoters or accelerators such as tertiary amines, suitably benzoyl-dimethyl amine, or weakly acidic amphoteric compounds such as dicyandiamide, stearic hydrazide, succinimide and cyanoacetamide. The composition may also contain various other materials such as plasticizers, elastomers, fillers, pigments, mold release agents and other resins.

Curable compositions according to the invention include the novel diureidyl curing agent and an epoxy resin or polyepoxide which may be of the aromatic or aliphatic type. The epoxy resins include those organic compounds containing a plurality of epoxy groups.

The polyepoxide-containing compositions which can be cured using the novel curing agent comprise organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

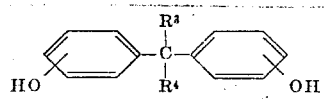

wherein the phenolic hydroxy groups may be in one of the 2,2'; 2,3'; 2,4'; 3,3'; 3,4'; or 4,4' positions on the aromatic nuclei, and each of $R^3$ and $R^4$ represent hydrogen, or alkyl group, such as methyl, ethyl, propyl, isopropyl, butyl, sec-butyl, tert.-butyl, pentyl, isopentyl, hexyl, isohexyl, and the like; a cyclo (lower)-alkyl group, such as a cyclohexyl or substituted cyclohexyl group, e.g., methyl-, ethyl-, propyl-, butyl-, pentyl- and hexyl- substituted cyclohexyl, or an aromatic group, such as phenyl, tolyl, xylyl, and the like. In addition, the phenolic rings may have other substituents besides the hydroxyl group, for example, lower alkyl groups containing from one to four carbon atoms, e.g., methyl, ethyl, propyl, isopropyl, butyl, secbutyl and tert.-butyl groups, halogen atoms, i.e., fluorine, chlorine, bromine or iodine, and the like.

An illustrative but, by no means exhaustive listing of dihydric phenols falling within this general formula includes 4,4'-dihydroxydiphenyldimethylmethane (bisphenol A), 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenltolylmethylmethane, and the like.

Other polyhydric phenols which may also be coreacted with an epihalohydrin to provide these resinous epoxy polyethers are such compounds as resorcinol, hydroquinone, substituted hydroquinones, e.g., p-tert.-butylhydroquinone, and the like, indanols such as those disclosed in U.S. Pat. No. 2,754,285 to Petropoulos, and polyhydric phenols having two hydroxyl aryl groups separated by an aliphatic chain of at least six carbon atoms in length, said chain being attached by carbon-to-carbon bonding to nuclear carbon atoms of the hydroxylaryl groups. All of such glycidyl ethers have a 1,2 epoxy equivalency greater than 1, usually between 1 and 2 and can be prepared by the method described in U.S. Pat. No. 2,538,072.

Among the polyhydric alcohols which can be coreacted with an epihalohydrin to provide these resinous epoxy polyethers are such compounds as ethylene glycols, pentane diols, bis (4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2,2'-,3,3'-tetrahydroxydipropyl sulfide and the like, mercapto alcohols such as α-monothioglycerol, α,α'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by means of the above-described curing agents includes the epoxy novolac resins obtained by reacting, preferably, in the presence of a basic catalyst, e.g., sodium or potassium hydroxide, an epihalohydrin such as epichlorohydrin with the resinous condensate of an aldehyde, e.g., formaldehyde, and either a monohydric phenol, e.g., phenol itself, or a polyhydric phenol e.g., bisphenol A.

Still another class of polymeric polyepoxides which can be catalyzed with the above-described curing agents includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst, but, in the absence of alkaline or acidic catalysts, leaving the epoxy groups unaffected and, therefore, regularly or randomly dispersed along the polymer chain. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Particularly preferred polyethers are the diglycidyl ethers prepared from 2,2-bis(4-hydroxyphenyl) propane, i.e., bisphenol A. They contain a chain of alternating glyceryl and 2,2-bis(4-phenylene) propane radicals separated by intervening etheral oxygen atoms and have a 1.2-epoxy equivalency between about 1.0 and about 2.0 as well as preferably, a molecular weight of about 340 to about 1000, and an epoxide equivalent weight of about 170 to about 500. The epoxide or epoxy equivalent weight is the weight of glycidyl polyether per epoxide group.

The composition of the invention is prepared by mixing the curing agent and polyepoxide or glycidyl ether together at ordinary ambient temperature of say 20° to 25°C or at elevated temperature as high as 90°C which is below the temperature of activation of the curing agent with the polyepoxide. Preferably, such temperature of mixing is chosen so that the polyepoxide is fluid to permit easy stirring and dispersion of the curing agent throughout the polyepoxide. It will be understood, of course, that the various polyepoxides or glycidyl ethers described above and to which the curing agent is added, are in the B-stage or are only partially polymerized, to permit final curing thereof at elevated temperatures by the curing agent. With solid or viscous polyepoxides, a solvent such as ketone, methyl ethyl ketone, methyl isobutyl ketone, and the like, can be employed for incorporation of the amine salt curing agents.

The composition of the invention cures to a hard resinous infusible and insoluble material in a short time upon heating the composition to the activating temperature of the curing, such curing taking place at temperatures ranging from about 125°C to about 180°C in a short time. As the curing temperature is increased, the time required to obtain a satisfactory cure will be reduced. The minimum cure temperature will vary to some extent with the particular curing agents, accelerator, promoter and amounts thereof employed in the composition.

The epoxy systems or compositions according to the invention are useful in the production of laminates, for example, laminates of various materials including textile materials, particularly sheets of glass cloth, matting, graphite, asbestos, cotton duck and the like, can be coated or impregnated and bonded together employing the epoxy formulation of the invention in a partially cured form, and such impregnated laminates containing said epoxy formulation can be stored at room temperature for extended periods. A final cure can be effected for such laminates by subjecting the laminate to sufficiently elevated temperature as previously noted to cause reaction of the epoxy groups of the epoxy bonding agent.

The epoxy system of the invention is also useful for the impregnation of tapes of fibrous materials, especially for the impregnation of fiber glass tapes for use in the production of pressure windings or pressure vessels. Thus, for example, an impregnated fiber glass cloth tape according to the invention can be prepared by dipping the fiber glass cloth into a liquid polyepoxide or liquid epoxy resin formulation containing the curing catalyst in accordance with the invention.

According to another application of the epoxy composition of the invention, such composition can be formed into molding powders which can be cured by the application of heat and pressure to produce cured moldings.

The following are examples of practice of the invention, all parts being expressed in terms of parts by weight unless otherwise indicated.

EXAMPLE 2

To an equal blend of low and high molecular weight diglycidyl ether of Bisphenol A such as, Shell's EPON 828 and 1001, 6 phr Dycyandiamide and 2.6 phr of the lactic acid salt of 2,4,6,-tri-(dimethylaminoethyl) phenol (DMP-30) were added. The material was coated at 180°F on a 5602 Dacron fabric, (a linear polyester) support. The aluminum lap shears of this material cured at 250°F for 1 hours is 4,300 psi.

EXAMPLE 3

To an equal part blend of a Bisphenol A type resin; such as Shell's EPON 828 and an Epoxidized Novolac type resin; such as Dow's DEN-438, 6 phr Dicyandiamide and 2 phr lactic acid salt of DMP-30 were added. The material was coated at 180°F on a 120 glass fabric and a 25 ply panel was prepared and cured at 300°F for 1 hour. The Barcol compression hardness of this panel is 61.

EXAMPLE 4

To a blend of 50 parts of EPON 1001 and 35 parts of EPON 828, six parts Dicyandiamide, four parts of the curing agent of Example 1 and 1.5 parts of the lactic acid salt of DMP-30 were added. The material was coated on a 5602 Dacron support. The aluminum lap shears of this material cured at 250°F is 4870 psi.

EXAMPLE 5

To a blend of 65 parts of an Epoxidized Novolac type resin; such as Union Carbide's ERR-0100 and 35 parts of EPON-828, 6 phr Dicyandiamide and 4 phr of the curing agent of Example 1 were added. The material was coated at 180°F on a 120 glass fabric and a 25 ply panel was prepared and cured for 1 hour at 300°F. The Barcol compression hardness of this panel is 70.

From a comparison of Example 2 and 4, and 3 and 5, it is evident that polyepoxy compositions containing the curing agent of this invention cure to a more advanced state at high temperature to provide a superior strength and hardness.

Compositions were prepared containing 10 phr of various diuredo curing agents alone and in combination with 5 phr of DICY; and further in combination with 3 phr of the lactic acid salt of DMP-30 or 2 phr of Benzyldimethylamine per epoxy equivalent of EPON 828. DTA were run to determine the temperature at which the reaction (curing) exotherm occurs. The results are presented in the following table.

| Example | Reaction product of Dimethylamine with | DTA exotherm of a 10 phr catalyst in EPON 828 | | | |
|---|---|---|---|---|---|
| | | as is | + Dicy | + Dicy Salt[4] | + Dicy/ BDMA[3] |
| 1 | methylene p-diphenyl diisocyanate | 183°C | 158°C | | 138°C |
| 2 | TDI | 170°C | 142°C | | |
| 3 | Nacconate H-12[1] | 195°C | 160°C | | |
| 4 | TMDI[2] | 193°C | 164°C | | 136°C |
| 5 | IPDI | 192°C | 157°C | 138°C | 138°C |

1 - Nacconate H-12 is a Registered trade name of Allied Chemical Corp. for 4,4'-Methylene bis(cyclo-hexyl isocyanate).
2 - TMDI is trimethyl-hexamethylene diisocyanate
3 - BDMA is Benzyl dimethylamine
4 - Lactic acid salt of DMP-30

The curing system of the invention (Ex.5) has consistently higher DTA than aromatic diureas of Examples 1 and 2, the aliphatic diurea of Example 4 has very similar DTA's to the cycloalkyl diurea of Example 3.

The latency of the curing agent of the invention was compared to other curing agents by forming epoxy compositions of EPON 828 containing equivalent amounts of curing agent on a basis of 0.1N atoms per epoxy equivalent. The results are presented below.

TABLE II

| Example | Curing agent, Dimethyl amine diurea of: | Gel Time, 245°F | Min. 308°F |
|---|---|---|---|
| 1 | methylene-p-diphenyl diisocyanate | 25.5 | 13.2 |
| 2 | TDI (Toluene Diisocyanate) | 22.4 | 10.5 |
| 3 | IPDI | 40 | 14.25 |

Extrapolation of the "Gel time line" to ambient temperatures will give the approximate shelf life or latency of the particular curing agent.

It is to be understood that only preferred embodiments of the invention have been described and that numerous substitutions, modifications and alterations are all permissible without departing from the spirit and scope of the invention as defined in the following claims.

What is claimed is:

1. A curable composition of matter comprising a polyepoxide resin containing a plurality of reactive 1,2-epoxy groups and 1 to 10 parts per hundred parts by weight of said resin of a curing agent of the formula:

$$\underset{R_2}{\overset{R_2}{N}}-\overset{O}{\overset{\|}{C}}-NH-R_1-\underset{(CH_2)_n}{\underbrace{\phantom{XXX}S\phantom{XXX}}}-NH-\overset{O}{\overset{\|}{C}}-\underset{R_2}{\overset{R_2}{N}}$$

where $R_1$ is alkylene of 1–10 carbon atoms, $R_2$ is lower alkyl of 1–10 carbon atoms and $n$ is an integer from 4 to 10.

2. A composition according to claim 1 further including less than five parts by weight per hundred parts of said resin of tertiary amine salts of an α-oxy substituted acid.

3. A composition according to claim 1 further including 0.3 to 10 parts of curing promoters or accelerators selected from the group consisting of tertiary amines and weakly acidic amphoteric compounds.

4. A composition according to claim 3 in which said compound is dicyandiamide.

5. A composition according to claim 1 in which the polyepoxide is polyglycidyl ether having an epoxy equivalency from 1 to 2.

6. A composition according to claim 5 in which the polyepoxide is a diglycidyl ether of 2,2-bis(4-hydroxyphenyl) propane.

7. A composition according to claim 1 in which $n$ is an integer from 6–8.

8. A composition according to claim 7 in which the curing agent is selected from compounds of the formula:

$$R_4-\underset{R_4}{\underbrace{\phantom{XXX}}}-NH-\overset{O}{\overset{\|}{C}}-N\underset{R_2}{\overset{R_2}{\diagup}}$$

$$R_4\phantom{XXX}R_5-NH-\overset{O}{\overset{\|}{C}}-N\underset{R_2}{\overset{R_2}{\diagup}}$$

where $R_2$ and $R_4$ are lower alkyl of 1–10 carbon atoms and $R_5$ is lower alkylene of 1–10 carbon atoms.

9. A composition according to claim 8 in which $R_2$ and $R_4$ are methyl and $R_5$ is methylene.

* * * * *